March 23, 1971 V. R. PETERSEN 3,572,324
AUTOMATIC GAIN CONTROL FOR A CARDIAC MONITOR
Filed April 1, 1969
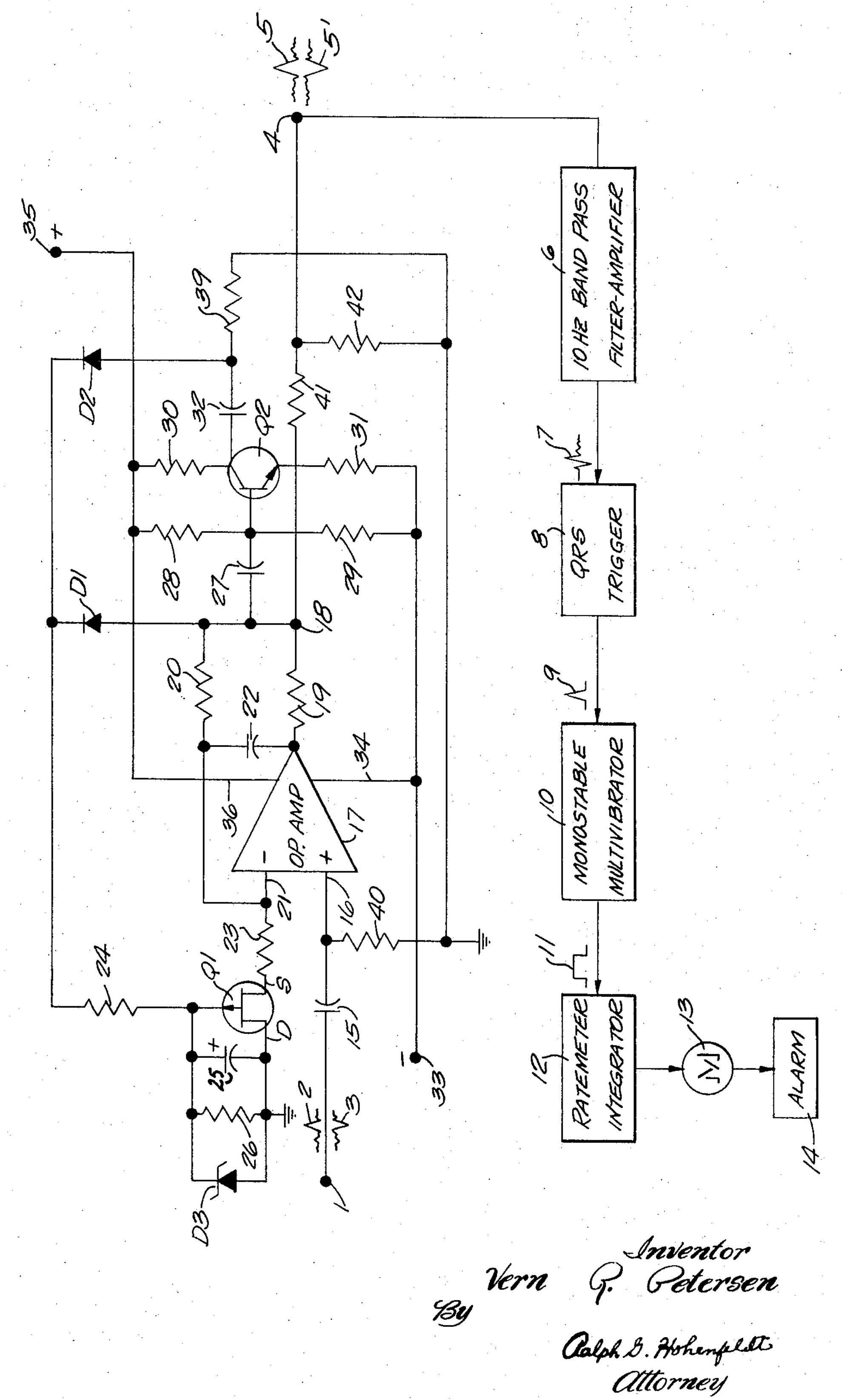
Inventor
Vern R. Petersen
By
Ralph G. Hohenfeldt
Attorney United States Patent Office 3,572,324

Patented Mar. 23, 1971

3,572,324
AUTOMATIC GAIN CONTROL FOR A CARDIAC MONITOR

Vern R. Petersen, Brookfield, Wis., assignor to General Electric Company

Filed Apr. 1, 1969, Ser. No. 812,138
Int. Cl. A61b 5/04
U.S. Cl. 128—2.06 2 Claims

ABSTRACT OF THE DISCLOSURE

Positive or negative going ECG signal waveforms are amplified in a differential-operational amplifier with negative feedback. The feedback circuit of the amplifier includes the drain-to-source path of a field effect transistor. A capacitor connected between the gate and drain has a voltage on it which automatically controls the gain of the amplifier by controlling the conductivity of the transistor. The single polarity control voltage is obtained either directly from the output of the amplifier or from an inverting transistor stage depending on whether the input signal is positive or negative. The amplifier output is held within a narrow amplitude range and is a faithful reproduction of the input signal. The output signal drives a cardiac ratemeter or other device.

BACKGROUND OF THE INVENTION

Cardiac monitors must detect arrythmias over a wide range of electrocardiograph (ECG) input voltages. The input voltages may vary independently of any heart rate change due to physiological changes which alter the electric signals produced by the heart or as a result of changes in the impedance of the electrode system that is used to pick-up the signals from the body. For example, if the patient turns over in bed, electric signals from the heart appearing on the surface of the body may change in amplitude. Patient movement may also affect electrode contact impedance which alters the signal level. Moreover, a damaged heart occasionally produces cardiographic signals which are inverted or alternately positive and negative.

These variable conditions make it difficult for the attendant to set the sensitivity of the monitor so it will detect heart rate for signal levels within a predetermined range but will not produce false alarms for variations within the range. The manual sensitivity controls which are commonly used in cardiac monitors do not meet this objective. An obvious proposal was to solve the problem by using automatic gain control circuits. However, known types of automatic gain controls are satisfactory only for operating on a continuous signal, but they are unsatisfactory for asymmetrical signals and with signals that go positive or negative as is characteristic of electrocardiograph signals from a patient with a damaged heart. Another problem is that ECG signals are a complex of low level P and T waves on each side of the normally much higher level QRS (R-wave) signal. Conventional automatic gain controls respond by changing the level of the P and T-waves disproportionately to the level of the R-wave. This results in the detector stage being supplied with two or three peaks instead of the one due to the R-wave. The additional peaks simulated an arrythmia or increased heart rate and false alarms still occurred. Moreover, it was difficult to get known automatic gain controls to work properly over the full range of heart rates which run from about thirty to about two hundred beats per minute.

Another consideration is that a good quality cardiac monitor will usually include a tuned filter for excluding 60 hertz noise and other artifacts while it emphasizes a 10 hertz signal which is the dominant frequency component of the QRS complex. The 10 hertz component is emphasized so that only the R-wave may be used for operating the ratemeter or triggering some other diagnostic device. If the signal level to the filter is not held at a nearly constant level, a tuned filter with ring and produce a poorly damped output signal. Amplification of the output signal then results in several peaks which are again responded to by the ratemeter as a multiplicity of beats for every actual beat. This constitutes an apparent arrythmia and will cause a false alarm.

SUMMARY OF THE INVENTION

Objects of the present invention are to provide in a cardiac monitor an automatic gain control that operates effectively over a wide range of ECG signal amplitudes, that is not adversely affected by asymmetry of the signals, that responds equally well to both positive and negative going signals and, that operates over a wide range of heart rates.

Additional objects are to provide an automatic gain control that is uncomplicated and inexpensive and that improves the overall performance of a cardiac monitoring system.

Briefly, the invention is characterized by feeding a pre-amplified ECG signal to the noninverting terminal of a differential-operational amplifier. The output signal of the amplifier is conducted through a feedback network to the inverting terminal of the amplifier. The input impedance to the inverting terminal includes a field effect transistor. The impedance of the transistor is modulated by the voltage on a gain control capacitor which is across its drain and gate terminals. Hence, the gain of the operational amplifier depends on the capacitor voltage. This voltage also depends on the level of the signal which is fed back.

The amplifier output signal, which is a faithful but amplified and substantially constant level replica of the input ECG signal, is fed to a selective filter which is preferably a twin-T type. The filter output is a differentiated signal that is coincident with the R-wave peaks. These peaks operate an electronic trigger which controls a monostable multivibrator, the output of which is a series of constant amplitudes square wave pulses corresponding with heart rate. The square wave pulses are integrated to produce a signal whose level is an analog of heart rate. This signal may drive a rate indicating meter and operate a high and low rate alarm.

A more detailed description of a preferred embodiment of the invention will now be set forth in reference to the drawing.

DESCRIPTION OF THE DRAWING

The drawing shows the new automatic gain control in schematic form and the remainder of a cardiac monitoring system in block form.

DESCRIPTION OF THE PREFERRED EMBODIMENT

In reference to the drawing, the whole system will be outlined first and then the new amplifier and automatic gain control, which is shown schematically, will be described in more detail. The output signals from an electrocardiograph, not shown, are applied to the input terminal 1 of the cardiac monitoring system. The ECG signal may be positive going as indicated by the waveform 2 or it may be negative going as indicated by the waveform 3. In either case, the signal appearing at output terminal 4 of the amplifier and AGC stage is an amplified replica of the input signal. The output signal marked 5 is considered positive and the one marked 5' is considered negative. These signals are each characterized by a low amplitude P-wave followed by a higher peak called the QRS complex or R-wave. The R-wave is followed by a low amplitude T-wave.

Whichever signal occurs at terminal 4 is applied to the input of a 10 hertz filter amplifier 6. Filter amplifier 6 is a known type which has an amplifier stage and a twin-T filter. Since the predominant fundamental frequency of the R-wave is 10 hertz, filter amplifier 6 is designed to emphasize this frequency and filter out other frequencies such as 60 hertz noise. Filters of this type exhibit ringing in their output. That is, the output waveform has a peak followed by an undamped oscillation which may have several peaks of lesser amplitude. The output waveform approximates the one marked "7" on the drawing. The output signal peak amplitude depends on the peak amplitude of the input signal so it is very important to maintain the R-wave peaks of the waveforms 5 or 5' constant.

The output signals from filter amplifier 6 are fed to a QRS trigger 8. The trigger 8 produces one output voltage spike 9 for each input signal 7.

The voltage spikes 9 drive a monostable multivibrator 10 which produces a square wave pulse 11 for each incoming spike 9. The square wave pulses 11 are all of the same amplitude and width. They are fed into a ratemeter 12 which has a known type of integrator stage. The integrator output voltage is exhibited on a meter 13 which displays the voltage analog of heart rate. The meter may have high and low rate limit contacts which operate an alarm 14 if the heart rate falls outside of these limits.

The schematic portion of the drawing relating to the new amplifier and automatic gain control system will now be discussed. The ECG signals that are applied to input terminal 1 are coupled through a capacitor 15 to the noninverting terminal 16 of an operational-amplifier 17. The amplitudes of the input signals 2 or 3 vary over a range of about 10:1. Ideally, the output signals appearing on output terminal 18 of the amplifier 17 would be constant but they may vary over a range of 2:1. The output signals at terminal 18 are positive or negative in accordance with whether there was a positive input signal 2 or a negative input signal 3.

Differential-operational amplifier 17 is provided with a D-C feedback circuit including series connected resistors 19 and 20 which are in turn connected to the inverting input terminal 21 of amplifier 17. Resistor 19 has a low value and is primarily for protecting amplifier 17 against overloads. There is also full A-C feedback through a swamping capacitor 22.

The gain of operational amplifier 17 is governed in the usual way, that is, by the ratio of feedback resistor 20 to the input resistance at the inverting terminal 21 of the amplifier. The input resistance in this case includes a fixed resistor 23 in series with the drain-to-source path of a field effect transistor Q1. Hence, it is evident that by controlling the resistance of Q1, the gain of operational amplifier 17 may be controlled. Resistor 23 is in the circuit to limit the maximum gain of the amplifier so that it will not amplify very low level signals or even noise which may exist when there are no ECG signals present. Most of the input impedance results from transistor Q1.

Positive going output signals from amplifier 17 are conducted through a diode D1 and a resistor 24 to a capacitor 25. Resistor 24 is primarily for compensating for variations in the characteristics between different field effect transistors of the same type. In this case, a P-channel field effect transistor Q1 is used which means that as the capacitor becomes positively charged the resistance between the drain and source of Q1 increases. This lowers the gain of operational amplifier 17. Maximum reverse bias between the gate and the drain terminals of Q1 is established by a Zener diode D3 which is in a parallel with capacitor 25. The Zener diode serves to provide discrimination from artifacts which would otherwise overcharge capacitor 25. Also in parallel with capacitor 25 is a resistor 26. The time constant of the capacitor 25 and resistor 26 combination is long enough to permit the capacitor to accept pulses at a rate of about thirty per minute and yet not so long as to prevent acceptance of pulses at rates corresponding with two hundred heart beats per minute. It is evident that the time constant must be such that the voltage on the capacitor will drop sufficiently after a given pulse to allow the next succeeding pulse, if it be a lower one, to determine the voltage on the capacitor and increase the gain. In reality, there is a beat-to-beat gain adjustment so that all parts of the ECG wave are amplified proportionally and faithfully.

When the output of operational amplifier 17 swings negative at terminal 18, diode D1 is reverse-biased. However, these negative going waveforms are coupled through a capacitor 27 to the base of a transistor Q2. Q2 has the usual bias voltage divider comprising resistors 28 and 29, a collector-resistor 30 and an emitter-resistor 31. Resistors 30 and 31 are so chosen that the gain of transistor stage Q2 is near unity but a little greater to compensate for losses. Incoming negative pulses through coupling capacitor 27 are inverted by transistor Q2 and coupled through a capacitor 32 and a diode D2 to the gain control capacitor 25 associated with field effect transistor Q1. It is thus evident that when the output of operational amplifier 17 is positive D1 conducts and when it is negative D2 conducts.

When an output signal from the amplifier 17 is lower than the one that preceded it, one or the other of the diodes D1 or D2 will conduct to raise the voltage on capacitor 25 to a given level above the voltage to which it declined during the interim between the preceding and present beat. The new lower voltage will, of course, make Q1 less resistive and the gain of operational amplifier 17 will increase so that its output signal remains at a constant level. When a signal has greater amplitude than the one which preceded it, either of the diodes D1 or D2 will conduct and raise the voltage on capacitor 25 to a new level which is higher than that which existed during the preceding beat. The gain of amplifier 17 will then be reduced and the output signal held at the predetermined constant level.

Operational amplifier 17 has the usual power supply connections comprising voltages which are positive and negative with reference to ground. The negative supply terminal which comes from a regulator or other source, not shown, is marked with the numeral 33 and is connected to the amplifier by way of a conductor 34. The regulated positive supply terminal has the numeral 35 and is connected to the amplifier by means of a conductor 26. A resistor 39 references coupling capacitor 32 to ground. There is a resistor 40 connected between the noninverting amplifier 17 and ground to keep the amplifier at the center point between the positive and negative input voltages that are applied by way of conductors 36 and 34.

In the output line from operational amplifier 17 there is a resistor 41 which together with a resistor 42 comprises a voltage divider. The voltage drop across resistor 42 establishes the level of the amplifier ECG waveforms 5 or 5' which are furnished to filter amplifier 6. As implied earlier, it is desirable to set this signal level so that the output of the filter amplifier 6 will not contain peaks which are near the amplitude of the principal positive or negative peak which is used to operate the QRS trigger 8.

From the foregoing description it should be evident that to use the monitoring system it is only necessary for the attendant to set up the electrocardiograph in the usual way for furnishing ECG signals to input terminal 1 of the gain controlled amplifier. No sensitivity adjustment is required. And yet, no false rate alarms will be produced for sizable variations in the ECG signal amplitude. An alarm signal will only occur when the heart rate exceeds the upper or lower limit that is set for a given patient.

I claim:

1. A cardiac signal monitor comprising:

(a) an operational amplifier having an output terminal and a noninverting input terminal and a coupling capacitor connected thereto for delivernig positive or negative polarity electrocardiograph signals to the amplifier, said amplifier producing corresponding positive or negative polarity output signals, (b) said amplifier also having an inverting input terminal and a feedback network connected between the inverting input terminal and the output terminal, (c) the input impedance of the operational amplifier including a field effect transistor having gate, source and drain terminals, the drain-to-source path being connected between ground and said inverting terminal, (d) a gain control capacitor and a discharge resistor both of which are connected in parallel between the gate and drain terminals, the resistance between the drain and source terminals depending on the voltage on the capacitor, the gain of said operational amplifier in turn depending on said resistance, and (e) a first diode connected in series circuit between the amplifier output terminal and the junction of said discharge resistor, said gate terminal and one side of said gain control capacitor, the other side of said capacitor being connected to the junction of another terminal of said transistor, and said discharge resistor, said first diode being adapted to conduct amplifier output signals of one polarity to said gain control capacitor, (f) a signal inverting stage connected to receive input signals from the output of the amplifier which output signals are of opposite polarity to those which are conducted by the first diode, and (g) a second diode connected to conduct the inverted output signals from said inverting stage to said gain control capacitor, the conduction or non-conduction of said diodes depending on the voltage that remains on said gain control capacitor between successive electrocardiograph signals.

2. The invention set forth in claim 1 including:

(a) a selective filter having an output terminal and an input terminal reeciving output signals from said operational amplifier, the said filter being characterized by its output signal exhibiting the effects of ringing when it receives input signals whereupon there is a principal signal peak and other lower amplitude peaks, (b) a trigger circuit that is adapted to produce an output voltage spike only in response to consecutive principal signal peaks, (e) a monstable multivibrator adapted to produce output pulses of constant amplitude and width in response to said voltage spikes, (d) an integrator for said constant output pulses, and (e) a meter displaying the output voltage from the integrator as an analog of cardiac rate.

References Cited

UNITED STATES PATENTS

| | | | |
|---|---|---|---|
| 3,267,934 | 8/1966 | Thornton | 128—2.06A |
| 3,449,684 | 6/1969 | Kagan | 330—145X |
| 3,451,006 | 6/1969 | Grangaard, Jr. | 330—145X |
| 3,474,778 | 10/1969 | Yen | 128—2.06F |

WILLIAM E. KAMM, Primary Examiner

U.S. Cl. X.R.

128—2.06F; 330—144